(12) United States Patent
Salice

(10) Patent No.: US 7,243,398 B2
(45) Date of Patent: Jul. 17, 2007

(54) PIVOT-ACTION DAMPER

(75) Inventor: Luciano Salice, Carimate (IT)

(73) Assignee: Arturo Salice S.p.A., Novedrate (Como) (IT)

( * ) Notice: Subject to any disclaimer, the term of this patent is extended or adjusted under 35 U.S.C. 154(b) by 113 days.

(21) Appl. No.: 10/638,447

(22) Filed: Aug. 11, 2003

(65) Prior Publication Data

US 2005/0071954 A1    Apr. 7, 2005

(30) Foreign Application Priority Data

Aug. 9, 2002   (DE)   ............................ 202 12 335 U

(51) Int. Cl.
*E05C 17/64*    (2006.01)
(52) U.S. Cl. .................... 16/341; 16/50; 16/54; 16/319
(58) Field of Classification Search .................... 16/51, 16/50, 54, 337, 342, 274, 412, 415, 438, 16/343, 344, 319, 341; 188/290, 293, 294, 188/306–308
See application file for complete search history.

(56) References Cited

U.S. PATENT DOCUMENTS

| | | | | |
|---|---|---|---|---|
| 1,269,519 A | * | 6/1918 | Benecke ...................... | 188/272 |
| 1,290,912 A | * | 1/1919 | Clark .......................... | 188/288 |
| 1,435,053 A | * | 11/1922 | Derihon ...................... | 188/306 |
| 2,790,520 A | * | 4/1957 | Kuhn, Jr. ..................... | 188/307 |
| 2,819,062 A | * | 1/1958 | Tack .................... | 280/124.105 |
| 4,842,106 A | * | 6/1989 | Ludwig et al. ............. | 188/266 |
| 5,419,013 A | * | 5/1995 | Hsiao .......................... | 16/319 |
| 5,697,122 A | * | 12/1997 | Okabe et al. .................. | 16/82 |
| 6,173,822 B1 | * | 1/2001 | Korb et al. .................. | 188/307 |
| 6,213,881 B1 | * | 4/2001 | Sasa et al. .................... | 464/24 |
| 6,314,612 B1 | * | 11/2001 | Rennecke et al. ............. | 16/54 |
| 6,390,255 B2 | * | 5/2002 | Kobori et al. .............. | 188/290 |
| 6,769,520 B2 | * | 8/2004 | Namiki et al. .............. | 188/290 |
| 2002/0020042 A1 | * | 2/2002 | Kurachi et al. ............... | 16/438 |

FOREIGN PATENT DOCUMENTS

| | | |
|---|---|---|
| DE | 201 04 100 | 5/2001 |
| JP | 63-231029 | 9/1988 |
| JP | 11-180261 | 7/1999 |

* cited by examiner

*Primary Examiner*—Katherine Mitchell
*Assistant Examiner*—Michael J. Kyle
(74) *Attorney, Agent, or Firm*—Dilworth & Barrese LLP

(57) ABSTRACT

A pivot-action damper which for example dampens the impact effect of the closing movement of doors, furniture doors or flaps displays excellent braking force or damping force, even over small angular regions as a result of an outer cylindrical body which encompasses an inner body which is pivotable in relation to said outer cylindrical body. Between the two bodies there are two chambers, separated from each other by a gap or a throttle position, with said chambers containing a liquid. This liquid is displaced from one chamber to the other as a result of the rotation of the two bodies in relation to each other.

24 Claims, 2 Drawing Sheets

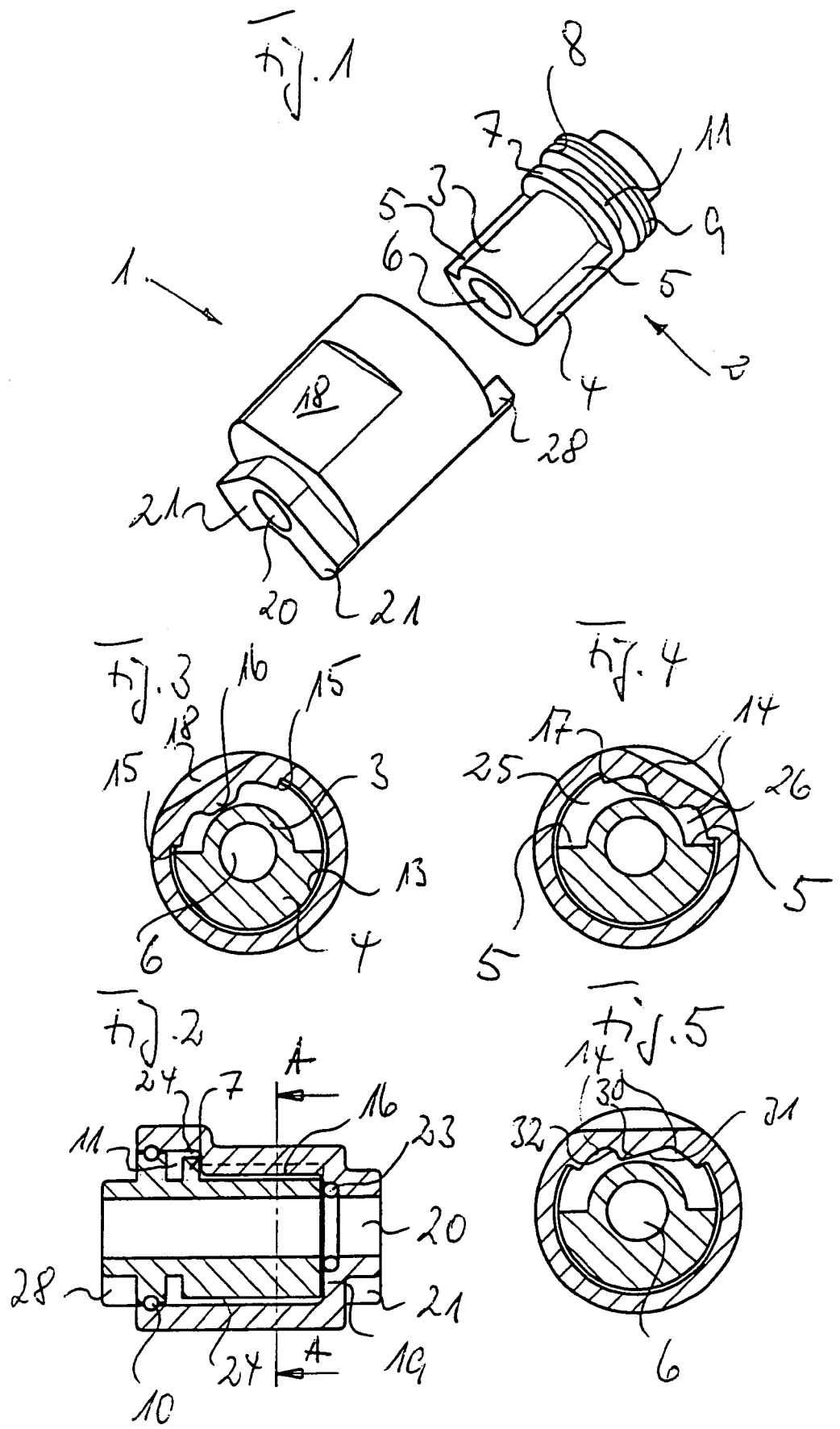

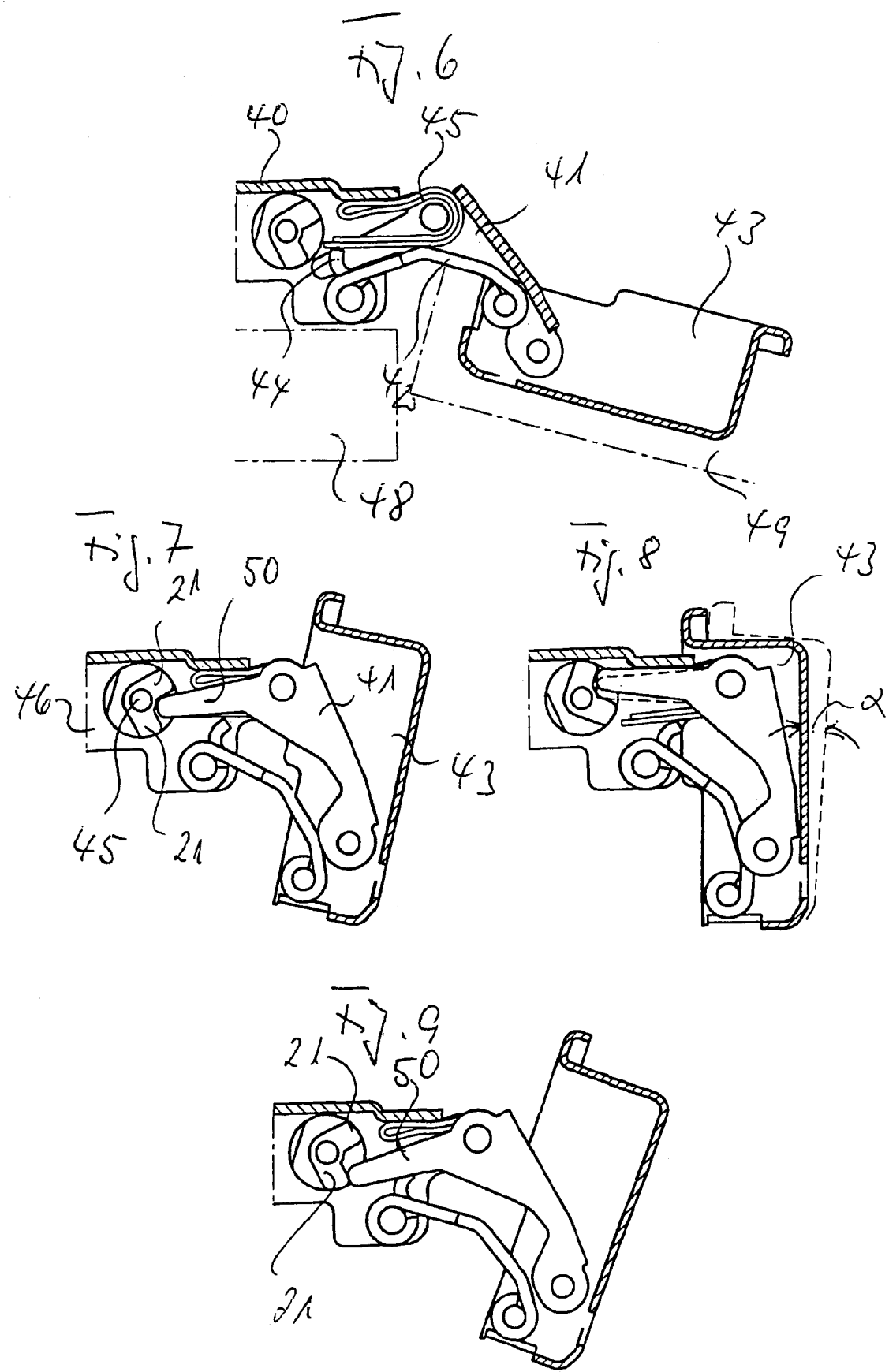

PIVOT-ACTION DAMPER

BACKGROUND OF THE INVENTION

The invention relates to a pivot-action damper.

Damping devices which are able to display their damping effect even over small angular regions are for example required for damping the closure movements of doors, furniture doors or flaps, in the closing region, in order to prevent a push effect when said doors or flaps abut against the end stops in the closed position.

From DE 201 04 100 U1, a damping device for furniture doors is known which comprises a rotation damper with a damping liquid and a pinion, with said rotation damper being connected to a hinge such that the pinion intermeshes with a toothed rack profile or intermeshes with teeth of an end stop component of the hinge. However, in a rotation damper of this type, the braking force or damping force is essentially only achieved by the molecular friction of the highly viscous medium with which the rotation damper is filled, so that said rotation damper provides only a relatively modest damping effect over the small angular region which corresponds to the area of the closing region of a door or flap.

It is thus the object of the invention to create a pivot-action damper which generates a large braking and damping force even if activated over small angular regions.

SUMMARY OF THE INVENTION

According to the invention, this object is met by a pivot-action damper which comprises an outer cylindrical body which encompasses an inner body which is rotatable in relation to this revolvable inner body, wherein between the two bodies there are two chambers, separated from each other by a gap or a throttle position, with said chambers containing a liquid, and with said liquid being displaced from one chamber to the other as a result of the rotation of the two bodies in relation to each other.

The pivot-action damper according to the invention can develop large braking forces even over small pivoting angles, because the damping effect is not only achieved by molecular friction in the liquid, but in particular also by the throttling of the liquid when it changes from one chamber to the other.

A preferred embodiment of the invention provides for the two bodies to be rotatable in relation to each other on a common axis; for the inner body around its circumference to comprise a cylindrical section with a larger radius and a cylindrical section with a smaller radius; for the cylindrical section with larger radius to rest against a wall of the outer cylinder, which wall is matched to said larger radius, with a dish-shaped space being formed between the cylindrical section with smaller radius and the wall of the outer body, with said dish-shaped space containing the two chambers; for the wall of the outer body parallel to the axis to comprise a contraction whose vertex region delimits a throttle gap with the cylindrical section with the smaller radius; and for the end regions of the cylindrical section with smaller radius of the inner body to be sealed in relation to the outer body. In this embodiment, the contraction at the inner wall of the outer body divides the dish-shaped space into the two chambers wherein, in a rotation of the two bodies in relation to each other, the liquid moves from one chamber through the throttle gap into the other chamber, thus generating the damping force.

The seal of one side of the dish-shaped space can comprise a partial ring collar which extends around the circumference of the section with the smaller radius, with the radius of said partial ring collar corresponding to that of the section with the larger radius, with said partial ring collar resting against the cylindrical wall of the outer body, adjacent to the contraction.

To seal the other side of the inner body against the outer body, the outer body can comprise a bottom which incorporates a borehole, wherein in the edge region of the bottom a sealing ring is held in a recess, with said sealing ring resting against a face of the inner body.

A further embodiment of the invention provides for one end region of the inner body to comprise a ring collar which is encompassed by an enlarged cylindrical section of the outer body, wherein the ring collar is sealed against the enlarged cylindrical section by a sealing ring. By means of the two sealing rings located in the end region of the inner body, the inner body is sealed against the outer body so that the liquid used for damping cannot flow out.

Expediently, each of the cylindrical sections of the inner body with larger and smaller radius extends for 180° so that the sections are spaced apart from each other by steps which are situated on one diameter plane.

Expediently, the steps between the cylinder-shell shaped sections of the inner body with larger and smaller radius are supported by end stops which are formed by steps on both sides of the contraction of the outer body. These end stops determine the angle over which the two bodies are pivotable in relation to each other.

A preferred embodiment provides for the diameter of the contraction at the inner wall of the outer body to comprise a longer bevelled flank and a shorter hollowed out flank. This construction of the flanks leads to a situation where the rotation of the outer body in relation to the inner body in the direction of the bevelled flank can be carried out with less resistance than is the case in the opposite direction. Such different resistance is expedient, for example to be able to open a door with less resistance than is provided in the closing region when the door is slammed shut.

Expediently, a ring groove is formed between the outer ring collar and the partial ring collar of the inner body, with said ring groove storing the damping liquid.

There can be expedient play between the cylindrical section of the inner body with a larger radius and the cylindrical wall of the outer body which encompasses said cylindrical section of the inner body. Since there is a damping liquid in the ring-shaped gap between the inner body and the outer body, the molecular friction of said damping liquid depends on the amount of play.

In order to achieve a large damping effect, the damping liquid is a highly viscous liquid. Expediently, the highly viscous liquid is a grease.

In order to be able to easily install the pivot-action damper according to the invention, the inner body can be non-rotatably held on an arbor.

A further embodiment of the invention provides for the arbor to be non-rotatably connected to a hinge component, and for the outer body to comprise an end stop which dampens the other hinge component via a limited pivoting angle by way of a counter end stop connected to said other hinge component.

If the hinge is a double swinging-arm hinge, the inner body can be held on a hinge arm of a double swinging-arm hinge, wherein one end of a swinging arm, which end is arranged at the hinge arm, comprises a prolongation which forms a counter end stop, with said prolongation interacting with at least one end stop of the outer body. Expediently, one end of the outer body comprises a V-shaped end stop. In addition, at its opposite end the outer body can comprise two end stop cams, so that the swinging arm correspondingly can comprise two forked prolongations. Below, one embodiment of the invention is explained in more detail by means of the drawing, as follows:

BRIEF DESCRIPTION OF THE DRAWINGS

The present invention will now be described in greater detail with reference to the accompanying drawings in which the following is illustrated in the respective figures:

FIG. 1 disassembled perspective views of the pivot-action damper according to the invention;

FIG. 2 a longitudinal section of the pivot-action damper according to FIG. 1 in its installed state;

FIGS. 3 and 4 sections of the pivot-action damper along the line A—A of FIG. 2, showing the end positions of the pivot-action damper;

FIG. 5 a section, which corresponds to FIGS. 3 and 4, of a pivot-action damper of different design; and FIGS. 6 to 9 longitudinal sections of a double swinging-arm hinge in different pivot positions of the pivotable dish-shaped hinge component which comprises a pivot-action damper according to FIGS. 1 to 5.

DESCRIPTION OF THE PREFERRED EMBODIMENTS

The pivot-action damper according to the invention comprises an outer cylindrical body 1 which encompasses an inner body 2 which is rotatable in relation to said outer cylindrical body 1, with FIG. 1 showing the two cylindrical bodies in a disassembled perspective view.

The inner body 2 consists of a section which comprises two semi-cylindrical shells 3, 4 with a smaller and a larger radius, with said two semi-cylindrical shells being separate from each other and concentric in relation to a central bore hole 6, so as to form steps 5 which are located on one diameter plane. The section of the inner body 2 with the two cylindrical shells 3, 4 is delimited by a partial ring collar 7 whose radius corresponds to the cylindrical shell 4 with greater radius. At its end which is opposite the section 3, 4, the inner body 2 comprises a further ring collar 8, which comprises a circumferential ring groove 9 into which a sealing ring 10 is inserted. Between the partial ring collar 7 and the ring collar 8 there is a ring groove 11.

The inner body 2 is inserted in the outer cylindrical body 1 in the way shown in FIG. 2. The outer cylindrical body comprises a middle section which comprises an inner cylindrical wall 13, which in the embodiment shown extends over a circumference of approx. 210°. Between this circumferential region 13, the inner wall comprises a circumferential section 14 which is separate from the circumferential section 13 by steps 15 extending in axial direction. Between these steps, the circumferential section 14 comprises a contraction 16 which consists of a bead extending in axial direction, with said contraction 16 together with the cylinder-shell-shaped section 3 with smaller radius delimiting a gap 17. With its left face shown in FIG. 2, the circumferential section 14 comprising the contraction 16 rests against the right flank of the partial ring collar 7 of the inner body 2.

In the area of the circumferential section 14 comprising the contraction 16, the cylindrical body 1 comprises a flattened region 18 which pushes the section 14 in.

On its right side, shown in FIG. 2, the outer cylindrical body 1 is closed off by a bottom 19, which comprises a bore hole 20. The bore hole 20 is encompassed by V-shaped ribs 21 which form end stops in the way already shown in the context of FIGS. 6 to 9.

The bore hole 6 of the inner body 2 is flush with the bore hole 20 and is of the same diameter.

The right side, shown in FIG. 2, of section 14 with the contraction 16, forms a transition to the bottom 18 of the outer cylindrical body 1, which bottom 18 comprises the borehole 20. In its edge area which comprises the borehole 20, the bottom 19 comprises a recess in which a sealing ring 23 is held, with said sealing ring 23 resting against the face of section 3, 4 of the inner body 2 so as to form a seal.

Between the dish-shaped space 4 of the inner body 2 with larger radius and the partial ring collar 7 on the one hand, and the cylindrical wall sections, which encompass these parts, of the inner wall of the outer cylindrical body 1 on the other hand, there are gaps 24 which are filled with grease, as is also the case in the chambers 25, 26, separated by the contraction 16, of the dish-shaped space between the inner body 1 and the outer body 2 and the ring space 11. In this arrangement, the ring space 11 forms a store for the grease, as shown in FIG. 2.

The diameter of the outer ring collar 8 is slightly larger than that of the dish-shaped body 4 with the ring collar 7 prolonging this body 4, with said outer ring collar 8 at its face towards the cylindrical interior wall of the outer body 1 being sealed off by a ring seal 10.

At its left end shown in FIG. 2 the outer cylindrical body comprises axial prolongations 28 which form end stops that correspond to the V-shaped ribs 21.

The axially extending steps 15, which separate the inner section 14 with the contraction 16 from the cylindrical circumferential section 13, form end stops for the steps 5 which are formed between the semicylindrical sections 3, 4 of the inner body 2. In this way, in the embodiment shown, the inner body 2 can be pivoted by an angle of approx. 60° in relation to the outer body 1.

The embodiment according to FIG. 5 differs from that according to FIGS. 3 and 4 in that the contraction 30 of the wall section 14 on one side comprises a flat inclined flank 31 and on the other side of the vertex line comprises a hollowed out part 32.

FIGS. 6 to 9 show a usual double swinging-arm hinge whose hinge arm 40 is connected to a pivotable hinge head 43 by way of the two swinging arms 41, 42. The inner swinging arm 42 comprises a tongue 44 bent out from its inner rolled-in end, which in the usual way interacts with a double-layer closing spring 45 curved in the manner of a hairpin.

The double swinging-arm hinge is unusual in that it comprises a pivot-action damper described by means of FIGS. 1 to 5. The pivot-action damper is arranged on one arbor 45 which is non-rotatably held between the lateral limbs 46 of the U-shaped hinge arm 40. The arbor 45 passes through the bore hole 6 of the inner body 2 and the bore hole 20 of the outer body 1. The inner body 2 is non-rotatably connected to the arbor 45, for example by way of pins, while the outer cylindrical body 2 is pivotable in relation to the studs 45.

In the embodiment shown, the hinge arm 40 is connected to a cabinet wall or a carcass part 48, while the pivotable hinge head 43 is connected to a door 49. In order to dampen the door when it is slammed closed between the pivot positions, shown in FIGS. 7 and 8, of the pivotable hinge component 3, i.e. over an angular region α of approx. 5 to 6°, the outer hinge arm 41 which comprises a sheet metal component bent in a U-shape comprises fork-like levers 50 which extend the limb of said hinge arm 41, with said fork-like levers 50, in the way shown, contacting the ribs 21 forming end stops and the projections 28 forming end stops, of the outer cylindrical body 1.

When the door 49 is opened, the levers 50 pivot the outer cylindrical body 1 of the pivot-action damper clockwise in the way shown in FIGS. 6 and 9, so that the arms 50 slide off the end stops 41, 28. However, if the door is closed in the way shown in FIGS. 7 and 8, the lever arms 50 come to rest against the upper end stops 41, 28 so that the door is dampened in the closing region, and accordingly, slamming the door with a strong impact is avoided.

The invention claimed is:

1. A pivot-action damper comprising an outer cylindrical body (1) which encompasses an inner body (2) which is rotatably-mounted in relation to said outer cylindrical body (1),
wherein
between the bodies (1, 2), there are two chambers (25, 26), separated from each other and interconnected by a gap (17) or throttle position solely and continuously defined between a contraction (16, 30) on an inner surface of said outer body (1) and an outer surface of said inner body (2),
said chambers (25, 26) containing a fluid,
said fluid being displaced from one chamber to the other as a result of the rotation of the two bodies (1, 2) in relation to each other,
the two bodies (1, 2) which are pivotable in relation to each other are rotatable on a common axis,
the inner body (2) around a circumference thereof comprises a cylindrical section (4) with a larger radius and a cylindrical section (3) with a smaller radius,
the cylindrical section (4) with larger radius rests against a cylindrical wall (13) of the outer cylindrical body (1), which wall (13) is matched to said larger radius, with a dish-shaped space being formed between the cylindrical section (3) with smaller radius and the wall (13) of the outer body (1), said dish-shaped space containing the two chambers (25, 26),
the wall of the outer body (1) parallel to the axis comprises said contraction (16, 30) whose vertex region delimits the throttle gap (17) with the cylindrical section (3) with the smaller radius, and
end regions of the cylindrical section (3) with smaller radius of the inner body (2) are sealed in relation to the outer body (1).

2. A pivot-action damper comprising an outer cylindrical body (1) which encompasses an inner body (2) which is rotatably-mounted in relation to said outer cylindrical body (1), wherein
between the bodies (1, 2), there are two chambers (25, 26), separated from each other and interconnected by a gap (17) or throttle position solely and continuously defined between a contraction (16, 30) on an inner surface of said outer body (1) and an outer surface of said inner body (2),
said chambers (25, 26) containing a fluid,
said fluid being displaced from one chamber to the other as a result of the rotation of the two bodies (1, 2) in relation to each other,
a seal of one side of a dish-shaped space (25, 26) formed between the cylindrical section (3) with smaller radius and the wall (13) of the outer body (1), comprises a partial ring collar (7) which extends around the circumference of the section (3) with the smaller radius, with the radius of said partial ring collar (7) corresponding to that of the section (4) with the larger radius, and
said partial ring collar resting against the cylindrical wall (13) of the outer body (1), adjoining the contraction (16, 30).

3. The pivot-action damper according to claim 1, wherein the outer body (1) comprises a bottom (19) which incorporates a borehole (20), in an edge region of the bottom (19) a sealing ring (23) is held in a recess, with said sealing ring (23) resting against a face of the inner body (2).

4. A pivot-action damper comprising an outer cylindrical body (1) which encompasses an inner body (2) which is rotatably-mounted in relation to said outer cylindrical body (1), wherein
between the bodies (1, 2), there are two chambers (25, 26), separated from each other and interconnected by a gap (17) or throttle position solely and continuously defined between a contraction (16, 30) on an inner surface of said outer body (1) and an outer surface of said inner body (2),
said chambers (25, 26) containing a fluid,
said fluid being displaced from one chamber to the other as a result of the rotation of the two bodies (1, 2) in relation to each other, and
one end region of the inner body (2) comprises a ring collar (8) whose circumferential area is sealed against the cylindrical interior wall of the outer body (1) by a sealing ring (10).

5. The pivot-action damper according to claim 1, wherein the cylindrical sections (3, 4) of the inner body (2) with larger and smaller radius extend across 180°.

6. The pivot-action damper according to claim 1, wherein steps (5) between the cylindrical sections (3, 4) of the inner body with larger and smaller radius are supported by end stops which are formed by steps (15) on both sides of the contraction (16, 30) of the outer body (1).

7. The pivot-action damper according to claim 1, wherein the cross-section of the contraction (30) at the inner wall of the outer body (1) comprises a longer beveled flank (31) and a shorter hollowed out flank (32).

8. The pivot-action damper according to claim 3, wherein the inner body (2) comprises a bore hole (6) which is aligned with the borehole (20) in the bottom (19) of the outer body (1).

9. A pivot-action damper
comprising an outer cylindrical body (1) which encompasses an inner body (2) which is rotatably-mounted in relation to said outer cylindrical body (1), wherein
between the bodies (1, 2), there are two chambers (25, 26), separated from each other and interconnected by a gap (17) or throttle position solely and continuously defined between a contraction (16, 30) on an inner surface of said outer body (1) and an outer surface of said inner body (2),
said chambers (25, 26) containing a fluid,
said fluid being displaced from one chamber to the other as a result of the rotation of the two bodies (1, 2) in relation to each other,
the inner body (2) comprises cylindrical sections (3, 4) of larger and smaller radius,
a partial ring collar (7) extends around the section (3) of smaller radius, one end region of the inner body (2) comprises an outer collar (8), and a ring groove (11) is formed between the outer collar (8) and the partial collar (7) and the cylinder-shell-shaped section (4) with large radius of the inner body.

10. The pivot-action damper according to claim 1, wherein there is play (24) between the cylindrical section (4) of the inner body (2) with larger radius, and the cylindrical wall (13) of the outer body (1) which encompasses said cylindrical section (4) of the inner body (2).

11. The pivot-action damper according to claim 1, wherein the fluid is a highly viscous damping liquid.

12. The pivot-action damper according to claim 11, wherein the highly viscous liquid is a grease.

13. The pivot-action damper according to claim 1, wherein the inner body (2) is non-rotatably held on an arbor (45).

14. A pivot-action damper comprising an outer cylindrical body (1) which encompasses an inner body (2) which is rotatably-mounted in relation to said outer cylindrical body (1), wherein
between the bodies (1, 2), there are two chambers (25, 26), separated from each other and interconnected by a gap (17) or throttle position solely and continuously defined between a contraction (16, 30) on an inner surface of said outer body (1) and an outer surface of said inner body (2),
said chambers (25, 26) containing a fluid,
said fluid being displaced from one chamber to the other as a result of the rotation of the two bodies (1, 2) in relation to each other,
the inner body (2) is non-rotatably held on an arbor (45), the arbor (45) is non-rotatably connected to a hinge component (40), and
the outer body (1) comprises at least one end stop (21, 28) which dampens another hinge component (43) via a limited pivoting angle by a counter end stop connected to said other hinge component (43).

15. A pivot-action damper, comprising
an outer cylindrical body (1) which encompasses an inner body (2) which is pivotable in relation to said outer cylindrical body (1), wherein
between the two bodies (1, 2), there are two chambers (25, 26), separated from each other by a gap (17) or throttle position, with said chambers (25, 26) containing a fluid, and said fluid being displaced from one chamber to the other as a result of the rotation of the two bodies (1, 2) in relation to each other,
the inner body (2) is non-rotatably held on an arbor (45), in turn, non-rotatably connected to a hinge component (40),
the outer body (1) comprises at least one end stop (21, 28) which dampens another hinge component (43) via a limited pivoting angle by a counter end stop connected to said other hinge component (43), and
the inner body (2) is held at the hinge arm (40) of a double swinging-arm hinge, one end of a swinging arm (41), which end is arranged at the hinge arm (40), comprises a prolongation or lever arm (50) which forms a counter end stop, with said prolongation or lever arm (50) interacting with said at least one end stop (21, 28) of the outer body (1).

16. A pivot-action damper
comprising an outer cylindrical body (1) which encompasses an inner body (2) which is rotatably-mounted in relation to said outer cylindrical body (1), wherein
between the bodies (1, 2), there are two chambers (25, 26), separated from each other and interconnected by a gap (17) or throttle position solely and continuously defined between a contraction (16, 30) on an inner surface of said outer body (1) and an outer surface of said inner body (2),
said chambers (25, 26) containing a fluid,
said fluid being displaced from one chamber to the other as a result of the rotation of the two bodies (1, 2) in relation to each other, and
one outer end of the outer body (1) on a side of the outer body (1) opposite the inner body (2) comprises V-shaped ribs (21) which form end stops.

17. A pivot-action damper, comprising
an outer cylindrical body (1) which encompasses an inner body (2) which is pivotable in relation to said outer cylindrical body (1), wherein
between the two bodies (1, 2), there are two chambers (25, 26), separated from each other by a gap (17) or throttle position, with said chambers (25, 26) containing a fluid, and said fluid being displaced from one chamber to the other as a result of the rotation of the two bodies (1, 2) in relation to each other,
one outer end of the outer body (1) on a side of the outer body (1) opposite the inner body (2) comprises V-shaped ribs (21) which form end stops, and
at an opposite outer end from the end of the outer body (1) comprising the V-shaped ribs (21), the outer body (1) comprises two end stop cams (28).

18. The pivot-action damper according to claim 1, wherein the seal of one side of the dish-shaped space (25, 26) comprises a partial ring collar (7) which extends around the circumference of the section (3) with the smaller radius, with the radius of said partial ring collar (7) corresponding to that of the section (4) with the larger radius, and with said partial ring collar resting against the cylindrical wall (13) of the outer body (1), adjoining the contraction (16, 30).

19. The pivot-action damper according to claim 2, wherein the outer body (1) comprises a bottom (19) which incorporates a borehole (20), wherein in an edge region of the bottom (19) a sealing ring (23) is held in a recess, with said sealing ring (23) resting against a face of the inner body (2).

20. The pivot-action damper according to claim 1, structured and arranged to activate damping action over an angular region of approximately 5° to 6°.

21. The pivot-action damper according to claim 6, wherein said inner wall (13) of said outer body (1) extends over a circumferential region of approximately 210°, and
between said circumferential region (13), said inner wall comprises a circumferential region (14) separated by said steps (15) extending in an axial direction.

22. The pivot-action damper according to claim 1, wherein said inner body (2) is structured and arranged to be pivotable by an angle of approximately 60° relative to said outer body (1).

23. The pivot-action damper according to claim 17, wherein said V-shaped ribs (21) are mounted upon the outer end of the outer body (1) to extend in a radial direction and the end stop cams (28) are mounted to extend in an axial direction.

24. The pivot-action damper according to claim 23, additionally comprising an axially-extending borehole (20) through the outer end of the outer body (1) at an intersection of the V-shaped ribs (21).

* * * * *